(12) United States Patent
Nguyen et al.

(10) Patent No.: US 12,132,181 B1
(45) Date of Patent: Oct. 29, 2024

(54) SMART COOLING SYSTEM FOR BATTERY ENERGY STORAGE SYSTEM

(71) Applicant: Schlumberger Technology Corporation, Sugar Land, TX (US)

(72) Inventors: Henry Nguyen, Katy, TX (US); Julien Toniolo, Sugar Land, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 18/656,723

(22) Filed: May 7, 2024

(51) Int. Cl.
*H01M 10/633* (2014.01)
*H01M 10/44* (2006.01)
*H01M 10/48* (2006.01)
*H01M 10/613* (2014.01)
*H01M 10/635* (2014.01)

(52) U.S. Cl.
CPC ....... *H01M 10/633* (2015.04); *H01M 10/441* (2013.01); *H01M 10/482* (2013.01); *H01M 10/486* (2013.01); *H01M 10/613* (2015.04); *H01M 10/635* (2015.04)

(58) Field of Classification Search
CPC ............ H01M 10/633; H01M 10/613; H01M 10/635; H01M 10/441; H01M 10/482; H01M 10/486
See application file for complete search history.

(56) References Cited

U.S. PATENT DOCUMENTS

| | | | | |
|---|---|---|---|---|
| 2006/0168975 | A1* | 8/2006 | Malone | H05K 7/20836 236/49.3 |
| 2017/0013062 | A1* | 1/2017 | Kim | H04L 12/2818 |
| 2019/0086476 | A1* | 3/2019 | Clark | G01R 31/392 |
| 2020/0303788 | A1* | 9/2020 | Rheaume | H01M 10/637 |
| 2021/0126304 | A1* | 4/2021 | Shao | H01M 10/627 |
| 2021/0192630 | A1* | 6/2021 | Hakimi-Boushehri | G01D 4/004 |
| 2024/0100990 | A1* | 3/2024 | Rawat | H02J 7/007192 |

FOREIGN PATENT DOCUMENTS

KR      2575306     *  9/2023

OTHER PUBLICATIONS

KR 2575306MT (Year: 2023).*

* cited by examiner

*Primary Examiner* — Alexander Usyatinsky

(57) ABSTRACT

Aspects of the disclosure provide for smart cooling of a battery energy storage system. An example smart cooling controller may include a weather forecaster, an energy cost forecaster, a state of charge forecaster, and a battery usage forecaster. The example smart cooling controller may be configured to determine one or more times to cool the battery energy storage system based on a weather forecast, an energy cost forecast, a state of charge, and a battery usage forecast, and to control a cooling system to cool the battery energy storage system at the one or more times.

20 Claims, 12 Drawing Sheets

SMART COOLING SYSTEM FOR BATTERY ENERGY STORAGE SYSTEM

FIELD OF THE DISCLOSURE

The disclosure relates to battery energy storage systems (BESSs).

DESCRIPTION OF RELATED ART

Energy storage is important to decarbonizing the power system and reducing greenhouse gas emissions. Energy storage is also essential to the building of resilient, reliable, and affordable electricity grids that can handle the variable nature of renewable energy sources (also referred to herein as, "renewables"). For example, the availability of wind and solar energy is variable due to the intermittent presence or absence of wind or sunlight at different times. Due to the intermittence of renewable energy sources as well as local, transient grid capability challenges, there is a need to store electrical energy.

A BESS may include rechargeable batteries that can store energy from different sources for later use. A BESS can be used to balance the electric grid, provide backup power, and improve grid stability. In some uses, BESSs enable energy from renewables, like solar and wind, to be stored and then for the energy to be discharged when needed, for instance the peak demand hours. A BESS may be used to smooth out fluctuations in power demand and supply, to regulate voltage and frequency, and to provide backup power in case of a power outage ensuring that essential services such as hospitals, emergency services, and communication networks remain operational. The use of BESSs can help to reduce the need for fossil-fuel-based power plants and to increase the integration of renewable energy sources into the grid. In recent years, advances in electrochemical battery technology makes BESSs a viable solution for large capacity energy storage, such as the energy storage for commercial applications, industrial applications, or other large grid level applications.

Round-trip-efficiency (RTE) is a crucial metric in evaluating the effectiveness of BESSs, particularly in the context of energy storage and retrieval cycles. RTE refers to the efficiency with which electrical energy is stored in and subsequently retrieved from the BESS over a complete charge-discharge cycle, for example, the amount of power needed for the BESS to properly work compared to the amount of energy dispatched. The RTE metric for a battery encapsulates losses incurred during the charging and discharging processes, including factors such as internal resistance, thermal losses, and conversion inefficiencies. During the charging phase, electrical energy from an external power source may be converted into chemical energy within the battery, a process that incurs losses due to resistive heating and other conversion inefficiencies. Subsequently, during discharge, the stored chemical energy may be converted back into electrical energy, with further losses occurring due to internal resistance and voltage conversion. The RTE of the BESS also measures the power required by additional elements of the system for the BESS to charge, store and discharge, as part of the power needed for the BESS, for example, as described in more detail herein with respect to the Equations 1-2.

Maximizing energy efficiency is paramount to ensure optimal utilization and cost-effectiveness of BESSs. Efficient RTE is critical for enhancing the economic viability and operational reliability of BESSs across various applications, including renewable energy integration, grid stabilization, and peak shaving. Higher RTE implies reduced energy losses and, consequently, increased overall system efficiency and performance.

Self-discharge contributes to energy losses and reduces the effective capacity available for energy storage and retrieval operations, impacting the RTE of the system. Self-discharge occurs when stored energy in a battery gradually dissipates over time, independent of external factors such as load or usage. This natural degradation of charge due to various mechanisms within the battery including chemical reactions, internal resistance, and imperfections in electrode materials and electrolytes. One primary cause of self-discharge is the internal chemical reactions occurring within the battery, even in the absence of an external circuit. These reactions, such as side reactions between electrode materials and electrolytes, result in the gradual breakdown of stored chemical energy, leading to a loss of charge over time. Additionally, internal resistance within the battery contributes to self-discharge by facilitating the flow of current within the battery, even when it is not connected to an external load. This internal resistance, caused by factors such as electrode porosity and electrolyte conductivity, allows for the gradual dissipation of stored energy as heat.

The rate of self-discharge varies depending on factors such as battery chemistry, temperature, and state of charge. For example, batteries with higher energy densities, such as lithium-ion batteries, typically exhibit lower self-discharge rates compared to lead-acid batteries or nickel-metal hydride batteries. Similarly, higher temperatures can accelerate self-discharge rates due to increased chemical activity within the battery. Mitigating self-discharge is crucial for maximizing the efficiency and performance of BESSs.

In order to optimize the battery lifetime and/or the battery performance (e.g., such as the RTE and/or to limit an amount of self-discharge) of the BESS, temperature control systems may be used to keep the batteries temperature controlled.

For certain battery chemistries, active cooling systems may be used to maintain the battery cell temperature within a tight temperature range (e.g., a range of 10 degrees Celsius such as between 15-25° C. or a range of 18 degrees Fahrenheit such as between 59-77° F.) due to safety and performance considerations. Other battery chemistries (e.g., including, but not limited to, Nickel-Hydrogen (Ni-H2) batteries) may allow for a larger temperature range (e.g., a range of 30-40 degrees Celsius such as between 0-40° C. or a range of 72 degrees Fahrenheit such as between 32-104° F.) without major constraints on durability or safety. Both types of battery chemistries may still exhibit temperature dependent RTE and self-discharge within the range of allowable cell temperature.

Some BESSs may be installed in extreme climates where the temperature may exceed the maximum allowable temperature for the battery cells of the BESS. In addition, during the charge phase and/or during discharge, the battery cells self-heat up. In such systems, the BESS may include an active cooling system relying on a refrigeration cycle, such as a water chiller or air conditioning systems, to actively cool the battery cells. The active cooling system may use electrical power and a heat sink connected to a condenser (e.g., the ambient air around the battery energy storage system).

In BESS, whether actively cooled or not, the RTE may be defined as the ratio of the total energy output by the system, $E_{out}$, to the total energy input to the system, $E_{in}$ as shown in Equation 1:

$$RTE = E_{out}/E_{in} \qquad \text{Eq. 1}$$

A high RTE value means that the incurred losses are low, resulting in high efficiency and cost-effectiveness of the BESS. The total energy input to the system, $E_{in}$, includes the energy used to charge the battery $E_{in\_charge}$ and any energy required for auxillary systems, $E_{in\_auxillary}$, such as pumps, fans, or active cooling systems for cooling the batteries, and the total energy output by the system, $E_{out}$, is the energy discharged by the batteries, $E_{out\_discharge}$.

The Coefficient Of Performance (COP) is a metric for evaluating the efficiency and effectiveness of cooling systems, particularly those reliant on vapor compression refrigeration cycles. The COP represents the ratio of the cooling thermal energy extracted from the BESS (CoolingCapacity) to the energy input to achieve that cooling (EnergyInput) as shown in Equation 2:

$$COP = CoolingCapacity/EnergyInput \qquad \text{Eq. 2}$$

In cooling systems, such as air conditioners, heat pumps, and refrigeration units, the COP is influenced by several factors, including the efficiency of the compressor, the characteristics of the refrigerant, the operating conditions, and the ambient temperature. Ambient temperature influences the thermodynamic properties of the refrigerant and the overall heat exchange process of the active cooling system. In a first approximation, the energy efficiency of the active cooling system is a decreasing function of the temperature of the ambient air. For example, for a cooling system, as the external ambient temperature increases, the temperature differential between the ambient temperature and the temperature of the BESS (to be cooled by the cooling system) increases, leading to reduced efficiency and COP of the cooling system. As a result, for the same amount of cooling thermal energy (CoolingCapacity) provided by the cooling system, the electrical energy (EnergyInput) needed increases because the compressor of the cooling system has to work harder in order to be able to condense its working fluid, resulting in a smaller COP. For the cooling system, as ambient temperature decreases, the temperature differential between the target interior temperature of the BESS (to be cooled by the cooling system) and the surrounding environment decreases, leading to improved efficiency and COP of the cooling system.

The electrical energy consumed by the cooling system is taken out of the battery net output, thereby decreasing the RTE of the BESS and increasing the costs of operating the BESS.

Accordingly, there exists a need for further improvements in cooling management for BESSs to overcome, at least, the aforementioned technical challenges.

SUMMARY

The disclosure provides for smart cooling of a BESS.

Some aspects provide a battery energy storage system. The battery energy storage system includes a plurality of rechargeable battery cells; a cooling system configured to cool the plurality of rechargeable battery cells; and a cooling management system configured to control the cooling system, the cooling management system comprising: one or more battery temperature sensors configured to collect temperature data of the plurality of rechargeable battery cells; one or more battery charge sensors configured to collect data of a state of charge of the plurality of rechargeable battery cells; and a smart cooling controller, the smart cooling controller including at least: an energy cost forecast processor configured to obtain an energy cost forecast of a current energy cost and a predicted future energy cost; and a battery usage forecast processor configured to determine a battery usage forecast of a current usage of the plurality of rechargeable battery cells and a predicted future usage of the plurality of rechargeable battery cells, wherein the smart cooling controller is configured to determine one or more times to cool the battery energy storage system based on the energy cost forecast, the state of charge, and the battery usage forecast, and wherein the cooling management system is configured to control the cooling system to cool the battery energy storage system at the one or more times.

Some aspects provide a method for cooling a battery energy storage system. The method includes collecting temperature data of a plurality of rechargeable battery cells; collecting state of charge data of the plurality of rechargeable battery cells; obtaining an energy cost forecast of a current energy cost and a predicted future energy cost; obtaining a battery usage forecast of at least a current usage of the plurality of rechargeable battery cells and predicted future usage of the plurality of rechargeable battery cells; determining one or more times to cool the battery energy storage system based on the energy cost forecast, the state of charge, and the battery usage forecast; and cooling the battery energy storage system at the one or more times.

Some aspects provide a smart cooling controller for cooling a battery energy storage system. The smart cooling controller includes an energy cost forecast processor configured to obtain an energy cost forecast of a current energy cost and a predicted future energy cost; a state of charge forecast processor configured to determine at least a current state of charge of a plurality of rechargeable battery cells; and a battery usage forecast processor configured to determine a battery usage forecast of a current usage of the plurality of rechargeable battery cells and a predicted future usage of the plurality of rechargeable battery cells, wherein the smart cooling controller is configured to determine one or more times to cool the battery energy storage system based on the energy cost forecast, the state of charge, and the battery usage forecast, and wherein the smart cooling controller is configured to control a cooling system to cool the battery energy storage system at the one or more times.

The following description and the appended figures set forth certain features for purposes of illustration.

BRIEF DESCRIPTION OF DRAWINGS

The figures show several embodiments of the system according to the disclosure.

DETAILED DESCRIPTION

The disclosure provides smart cooling for an active-cooled BESS.

In some aspects, the BESS includes a smart cooling controller configured to determine times for cooling and pre-cooling to maintain the temperature of the battery cells of the BESS within a specified temperature range. In some aspects, the smart cooling controller is configured to control the cooling and pre-cooling to optimize a revenue of the BESS. In some aspects, the smart cooling controller is configured to control the cooling and pre-cooling to optimize the round-trip-efficiency (RTE) of the BESS. In some aspects, the smart cooling controller is configured to control the cooling and pre-cooling based on a state of charge of the battery cells of the BESS.

In some aspects, the BESS is configured to obtain weather data, energy cost data, battery cell usage data, and/or battery state of charge data. In some aspects, the BESS includes sensors to measure the data. In some aspects, the BESS obtains the data through a network.

In some aspects, the smart cooling controller includes a weather forecaster, an energy cost forecaster, and a battery usage forecaster. In some aspects, the smart cooling controller uses the forecaster to determine current forecasts and/or predicted future forecasts for one or more later times, such as pre-cooling times and cooling times. In some aspects, the forecasters use the collected data to generate the forecasts.

Example Active-Cooled Battery Energy Storage System

Figure 1:
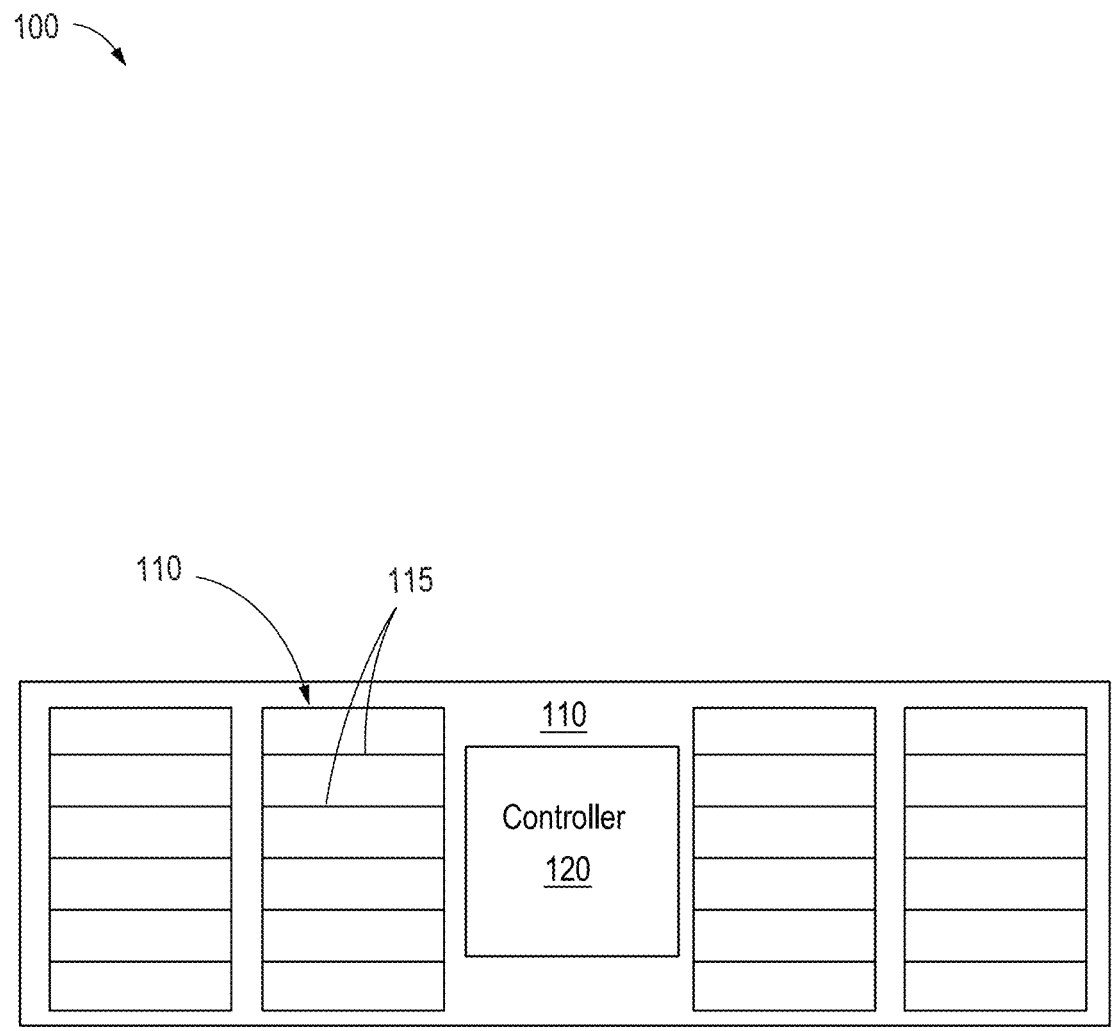
FIG. 1 depicts an example battery block of a BESS.

FIG. 1 depicts an example BESS 100. In some embodiments, the BESS 100 includes a battery block housing 105. In one example, the battery block housing 105 is a standard, or modified, shipping container (e.g., such as international organization for standardization (ISO) shipping container). As shown in FIG. 1, the battery block housing 105 may house one or more battery banks 110 of rechargeable batteries 115 (e.g., cells), and a control system 120.

A battery bank 110 may be a collection of multiple rechargeable batteries 115, connected in series or parallel, to provide a target voltage and current capacity. The batteries 115 used in battery bank 110 can be lithium-ion, lead-acid, nickel-hydrogen, magnesium-ion, metal-air, nickel-zinc, or any other types of rechargeable electrochemical batteries, depending on the specific application and requirements of the BESS.

The control system 120 may manage the operation of the battery banks 110, which may include monitoring the state of charge of the battery banks 110, controlling the output of an inverter, controlling charging and discharging operations of the battery banks 110, and protecting the battery banks 110 from overcharging, over-discharging, and other faults. According to certain aspects, the control system is responsible for optimizing the operation of the BESS 100 to meet the specific requirements of the application. The control system 120 may take into account factors such as power demand, electricity prices, renewable energy generation, grid conditions, the state of charge, scheduling charging and discharging times, ambient temperature conditions, and including forecasts of any of the factors, to determine the optimal charging and discharging strategies for the battery banks 110. The control system 120 are described in more detail herein with respect to the operations 800 of FIG. 8 and the energy management system 600 of FIG. 6. Although control system 120 is shown located within the battery block housing 105 in FIG. 1, it should be understood that the control system 120 may be located outside of the battery block housing 105, at a remote location, and/or may be distributed across a plurality of locations.

According to certain aspects, a BESS may include a collection of housings in various configurations. FIGS. 2A-4 depicts examples of various configurations of active-cooled BESSs, however, it should be understood that the BESSs described herein with respect to FIGS. 2A-4 are merely illustrative and the techniques described herein may apply to any active-cooled BESS system. For example, the BESSs described herein with respect to FIGS. 2A-4 provide a combinable set of stackable shipping containers arranged in various configurations, however, a BESS may be constructed in building, warehouse, or other housing or container, or may be a distributed energy storage system. Further, while particular configurations are depicts, a BESS may include any number of housings, any number of battery banks, and any number of batteries, in many different configurations. The physical implementation of a BESS often involves grouping these systems together in a limited space, such as outdoors on a concrete pad. However, energy density, cost per unit of energy stored, environmental conditions, system durability, or the need for cooling may constrain the systems.

Figure 2A:
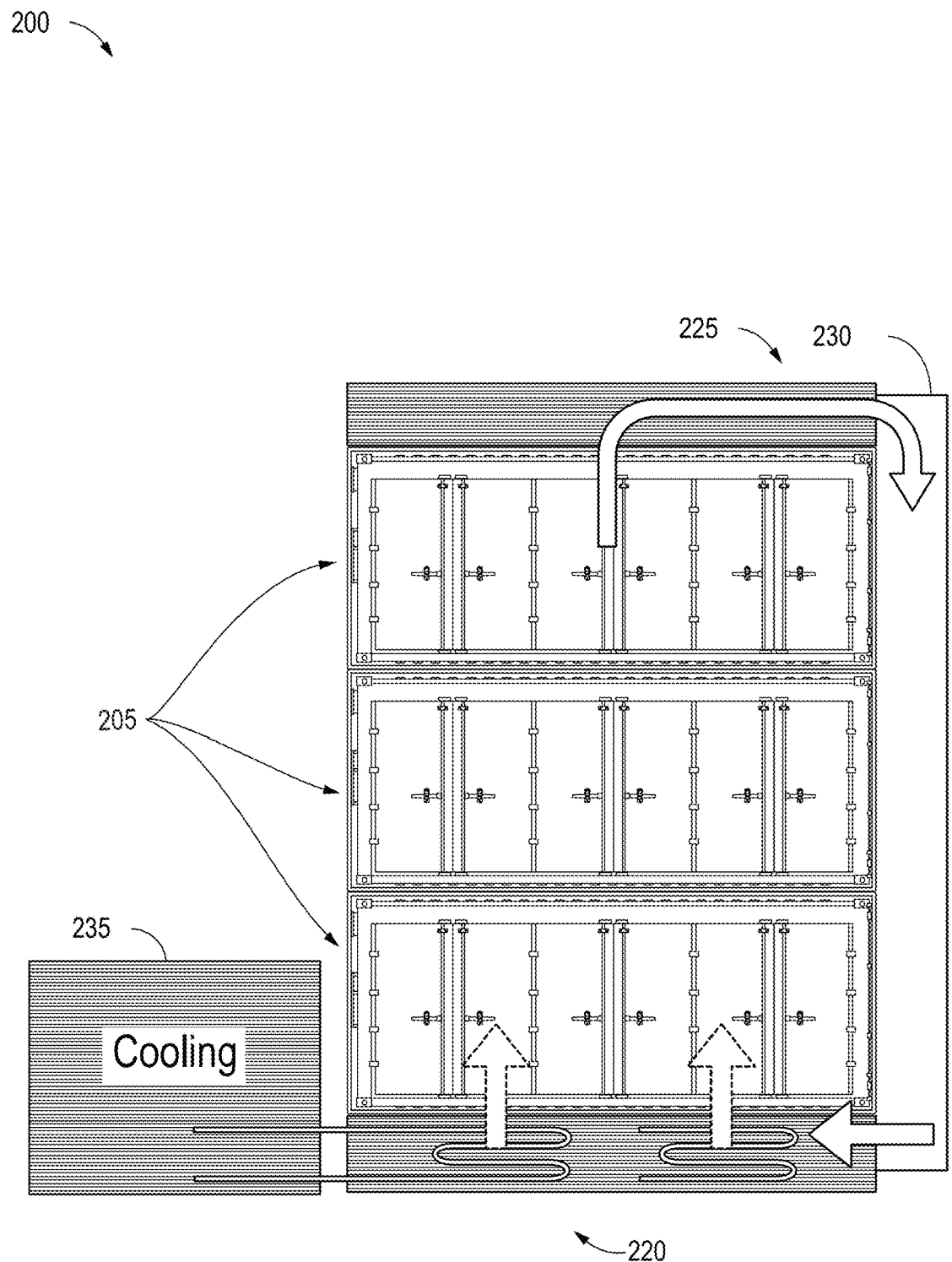
FIG. 2A depicts a front view of an example active-cooled BESS.
Figure 2B:
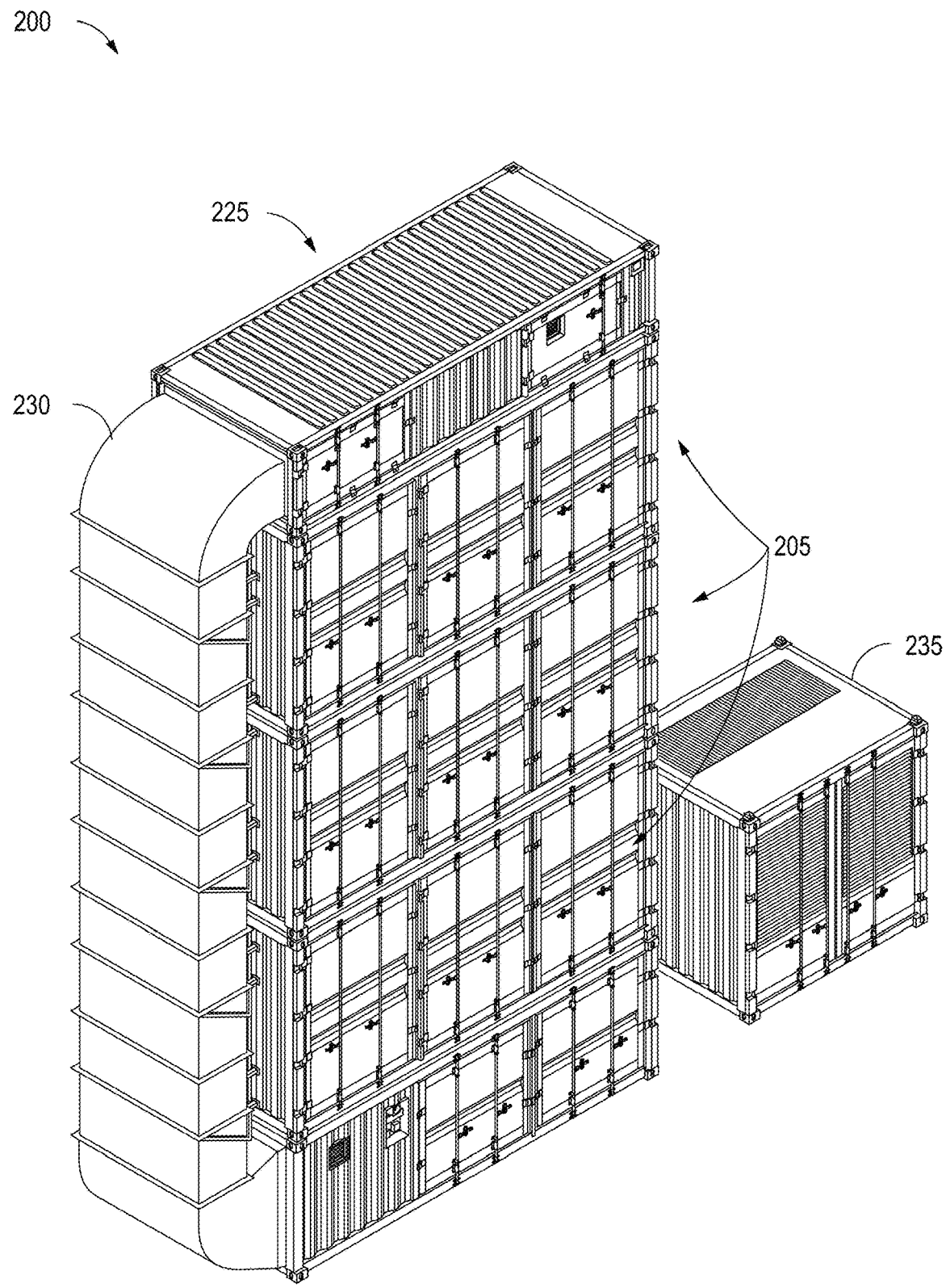
FIG. 2B depicts a top and side view of the example active-cooled BESS.

FIG. 2A depicts a front view of an example active-cooled BESS 200. FIG. 2B depicts a top and side view of the example active-cooled BESS 200.

In the example illustrated in FIGS. 2A-2B, the BESS 200 includes housings 205. In some aspect, the housing 205 include one or more battery blocks (e.g., similar to the battery block housing 105 described with respect to FIG. 1). In some aspects, in a BESS 200 with multiple housings 205, the batteries may be connected in series. Further, in a BESS 200 with multiple housings 205, the multiple housings 205 may be connected to each other by twist locks (e.g., by twist locks on both sides of the building block), or other type of locking mechanism. In addition, the multiple housings 205 may include electrical lines to enable electrical connection with the other housings, and/or air flow lines or interfaces between each adjacent housing to enable air flow with the other stacked building blocks.

As shown, the active-cooled BESS 200 includes a cooling system block 235 that can be used to cool down the system. The cooling system block 235 may provide actively cooled air 220 to the BESS 200. In the illustrative example depicted in FIGS. 2A-2B, the cooling system block 235 circulates cooled air to an air interface at the BESS 200 connected via a duct. In the example illustrated in FIGS. 2A-2C, the cooling system block 235 circulates the cooled air to a standoff block 205c of the housings 205.

Figure 2C:
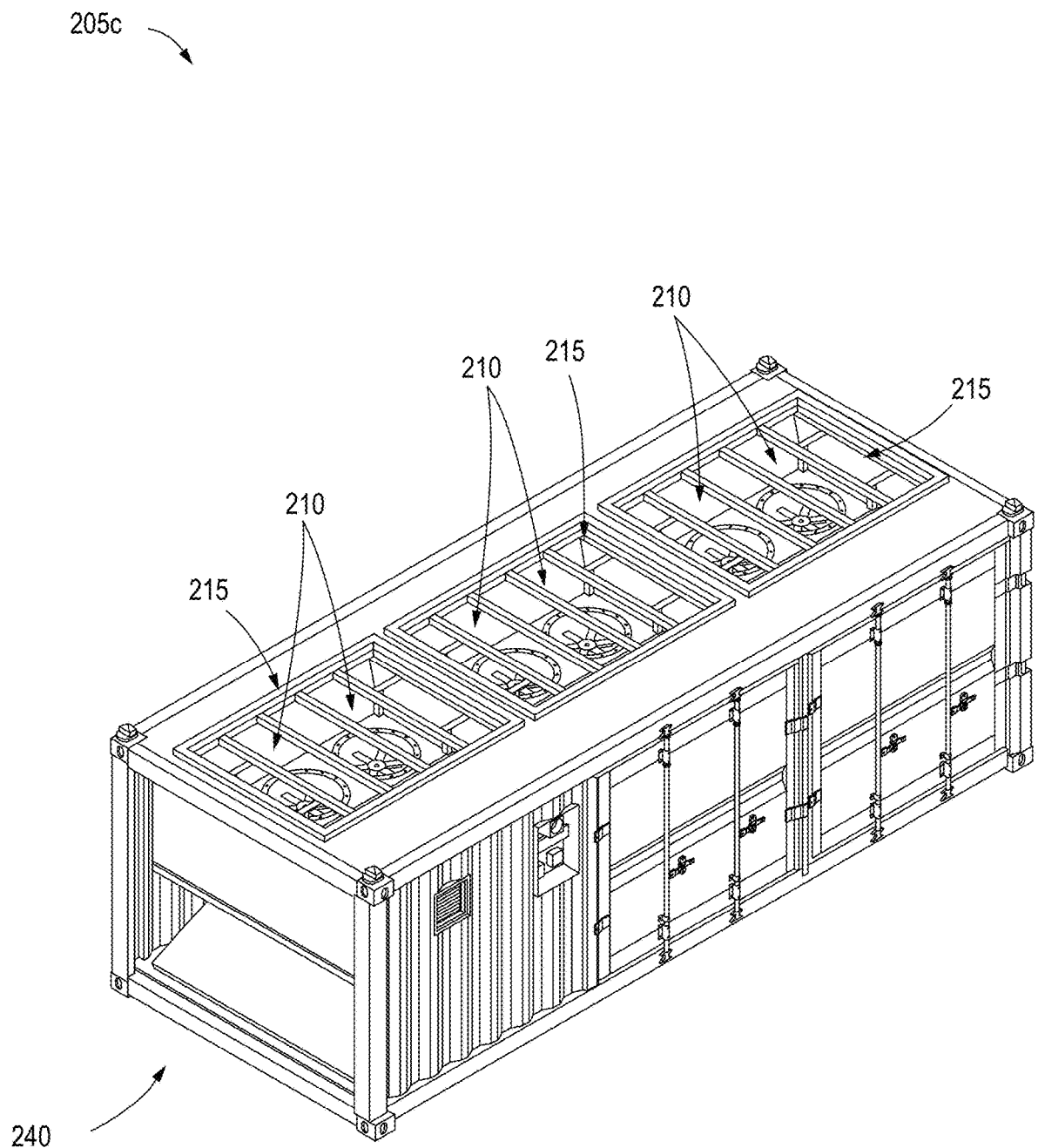
FIG. 2C depicts a top and side view of an example standoff block of the active-cooled BESS.

FIG. 2C depicts a top and side view of an example standoff block 205c of the BESS 200. The standoff block 205c may be interposed between the ground and the next housing 205. As shown in FIG. 2C, the standoff block 205c may house one or more forced-air components 210, such as circulating fans and one or more flow interfaces 215, such as openings or vents at the top of standoff block 205c, which can be connected to the flow interfaces of the lowest building block. One or more flow interfaces 240 may couple to the circulation duct 230 and/or the cooling system block 235. In some aspects, the standoff block 205*c* houses an evaporator (not shown) and/or a heat exchanger (now shown).

In some aspects, the cooling system block 235 uses a refrigerant cycle where the air in the BESS 200 is looped and cooled down due to a connection to an evaporator of the active cooling system. The connection can be direct, where the same air that is circulated around the cells is circulating through the evaporator, or indirect, where the air that is circulated around the cells is circulated through a heat exchanger (e.g., via openings). In some aspects, circulation duct 230 may recirculate warm air 225 that exits from the BESS 200 back to the cooling system block 235 to be actively cooled and then re-introduced to the BESS 200. As shown, the circulation duct 230 may connect to a cap block 205*d* of the housings 205.

Figure 2D:
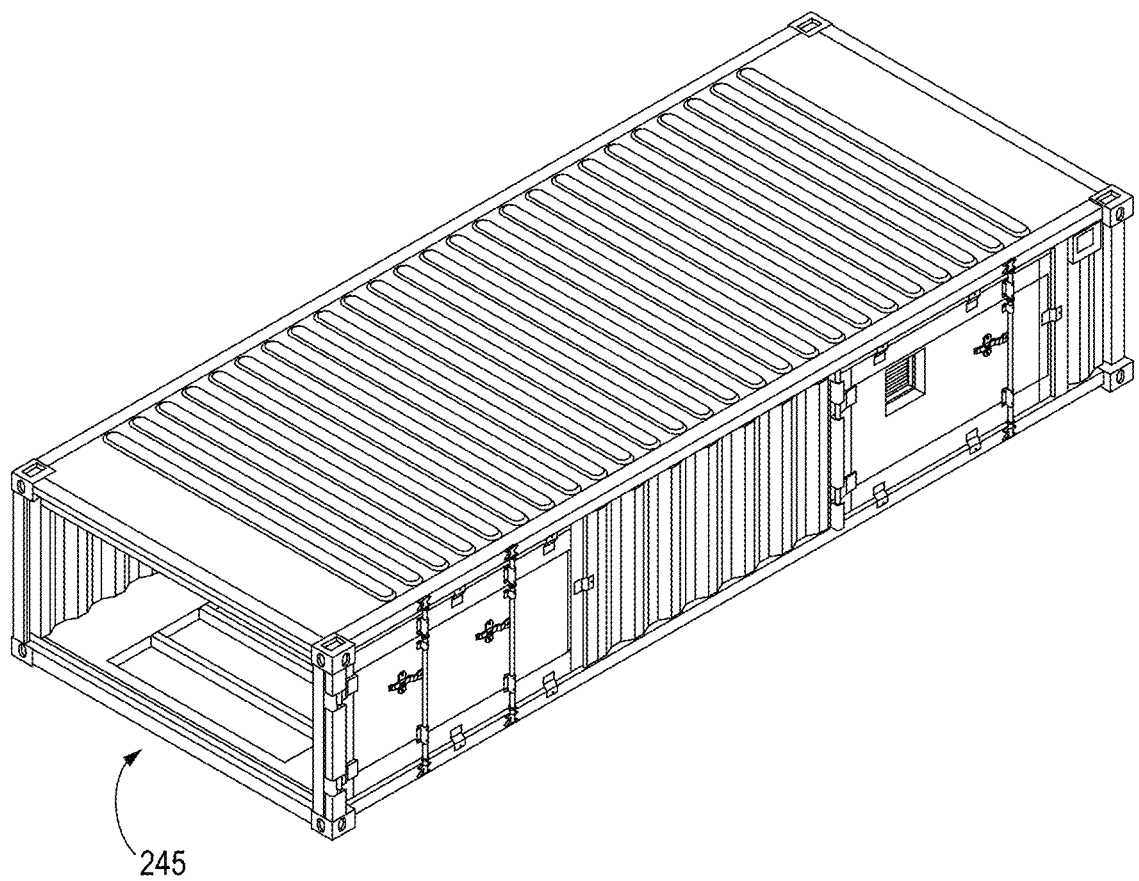
FIG. 2D depicts a top and side view of an example cap block of the active-cooled BESS.

FIG. 2D depicts a top and side view of the example cap block 205*d* of the active-cooled BESS 200. The cap block 205*d* may cover the uppermost housing 205 to protect the BESS 200 from the environment (e.g., such as sun irradiance, rain, or other environmental elements). As shown in FIG. 2D, the cap block 205*d* may include one or more air and/or electricity flow interfaces 245, such as an interface that couples with the circulation duct 230 to recirculate the warm air 225 exiting the cap block 205*d*.

In some aspects, the active-cooled BESS 200 may include a power module (not shown) containing a power system and/or additional elements to connect the energy storage system to the grid, such as an inverter, a transformer, power lines, etc.

In some aspects, the cooling system block 235 and/or the power module may be located on the ground next to the BESS 200 (e.g., for case of maintenance and service). In some aspects, the cooling system block 235 and/or the power module may be located in the BESS 200.

In some aspects, the BESS 200 may further include other components not shown, such as an inverter module (e.g., a bidirectional alternating current direct current (AC-DC) converter, a transformer module (e.g., an isolation transformer), power lines, etc.

Figure 3:
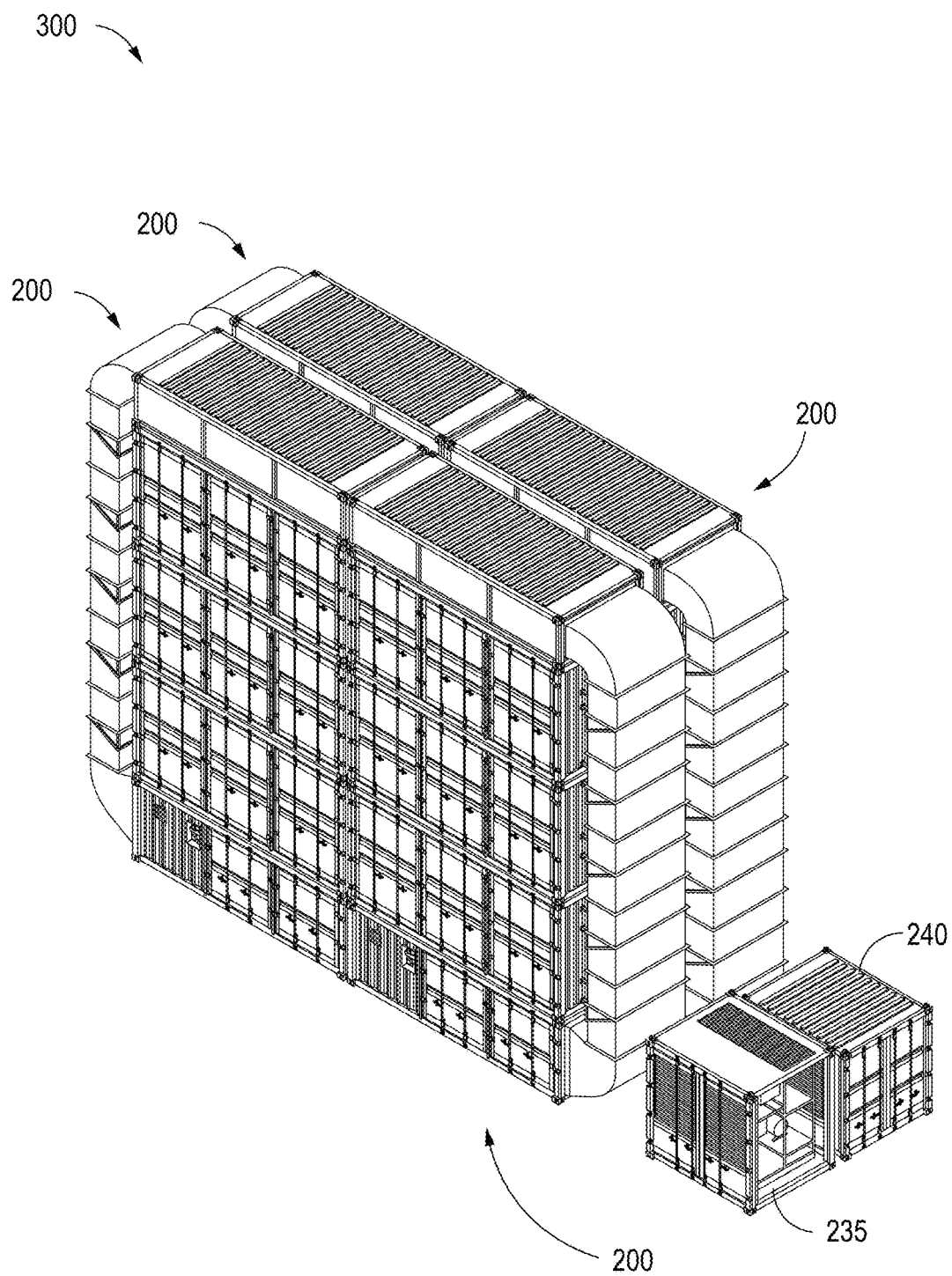
FIG. 3 depicts a top and side view of a configuration of a cluster of four example active-cooled BESSs.
Figure 4:
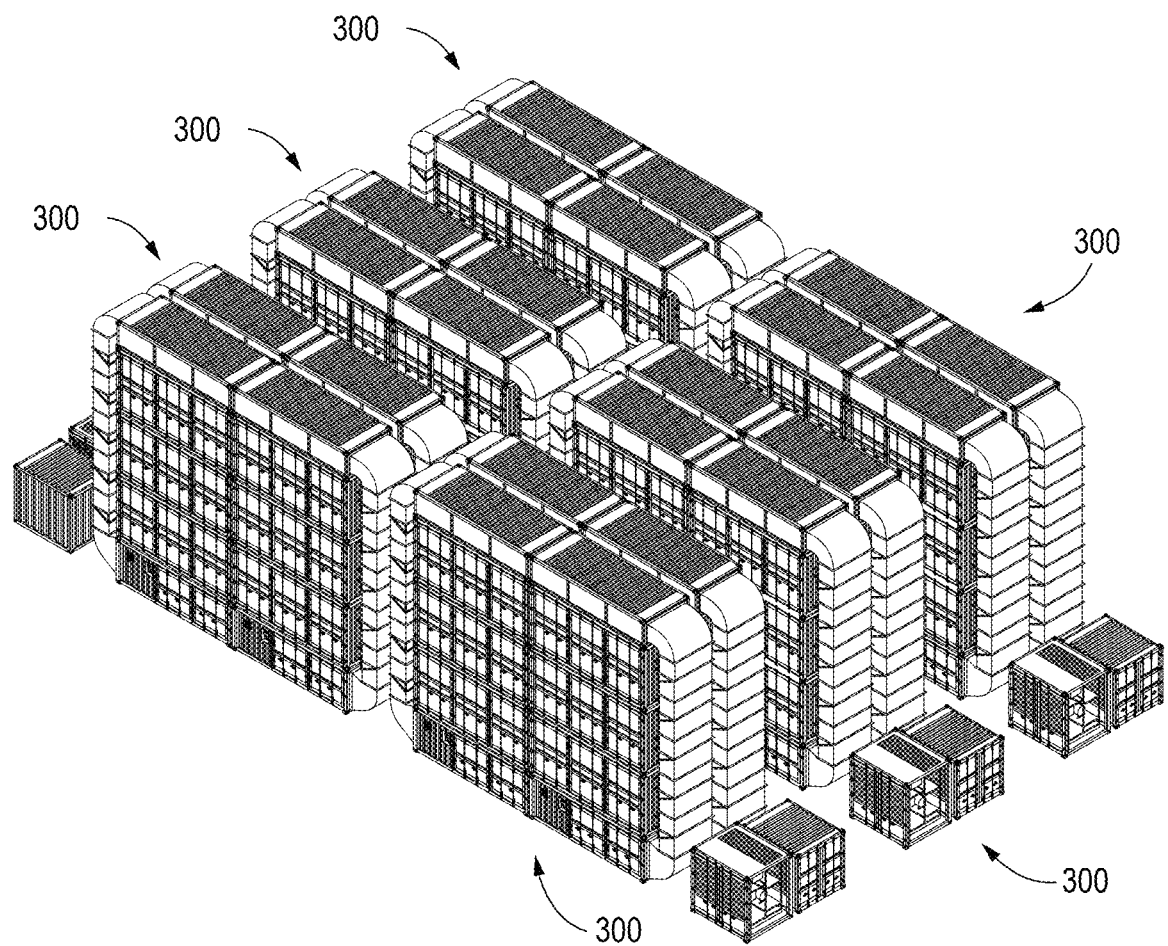
FIG. 4 depicts a top and side view of a configuration of a cluster of twenty-four example active-cooled BESSs.

In some aspects, multiple BESSs 200 may be grouped together (e.g., located in a close geographic proximity or together on a site). FIG. 3 depicts a top and side view of an example configuration of a clustered BESS 300 including four active-cooled BESSs 200. The BESSs 200 in the clustered BESS 300 may share the cooling system block 235 and/or power system block 340 as shown in FIG. 3. Alternatively, each of the BESSs 200 in the clustered BESS 300 may have separate cooling systems and/or power systems. For example, FIG. 4 depicts a top and side view of a configuration of sixteen clustered BESSs 200. In the illustrative example depicted in FIG. 4, multiple clustered BESS 300 stacks can be grouped next to each other, with each clustered BESS 300 sharing the cooling system block 235 and power system block 340. Accordingly, the active-cooled BESSs 200 can achieve high energy density, while also being efficiently cooled.

Figure 5:
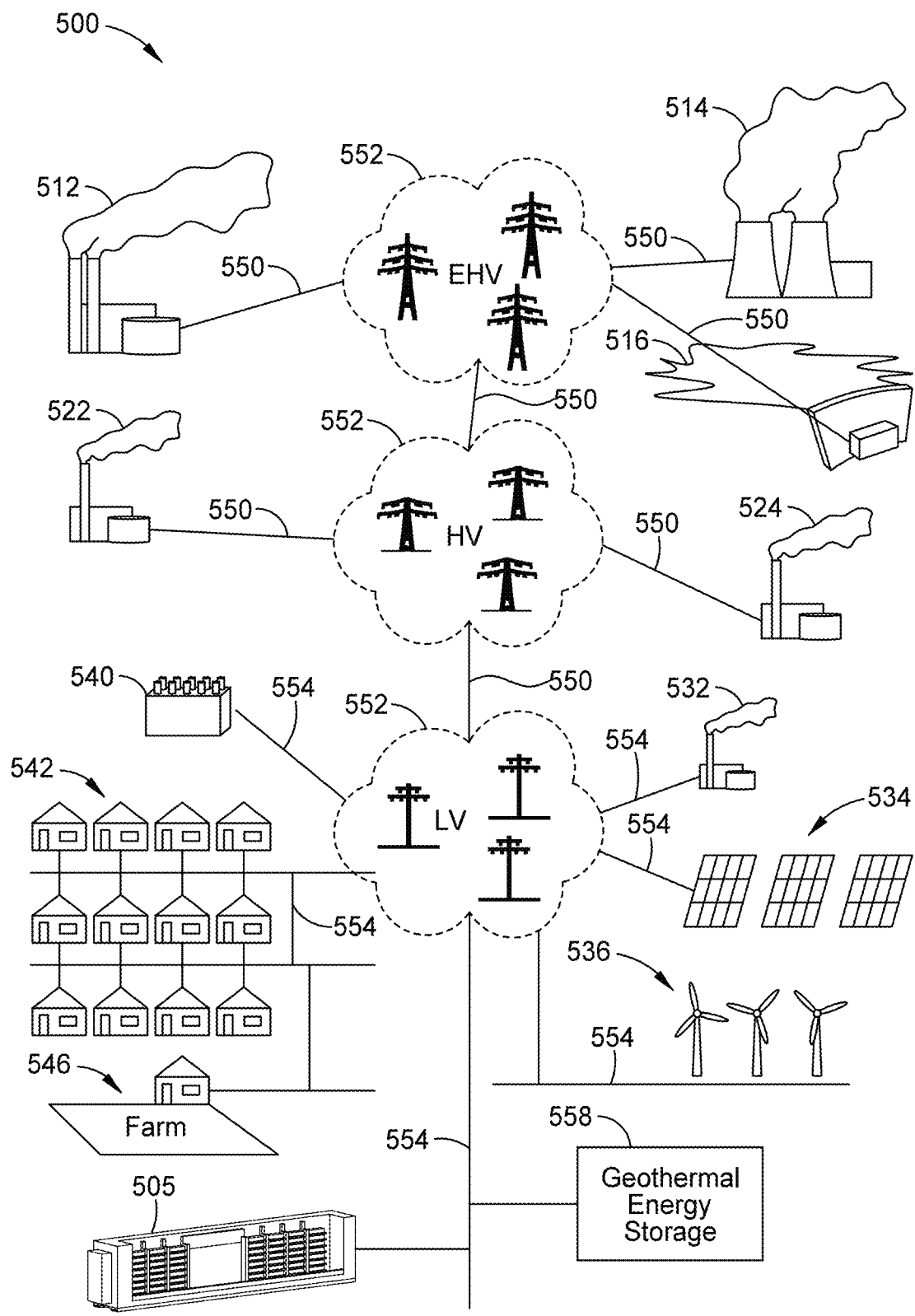
FIG. 5 depicts an example energy grid including active-cooled BESSs.

In some aspects, a BESS (e.g., such as active-cooled BESS 200) may be a standalone energy system or may be part of an energy grid. FIG. 5 depicts an example energy grid including active-cooled BESSs 200. An energy grid, also known as an electrical grid, is a complex interconnected system of power generators, transmission lines, transformers, and other electrical infrastructure that work together to deliver electricity from energy sources to homes, businesses, and other consumers. Electrical grids vary in size and can cover whole countries or continents.

The energy grid 500 may be divided into three main parts: generation, transmission, and distribution. Electricity generation is the process of generating electric power from sources of primary energy, which may be at power stations. Power stations may be located near energy sources and away from heavily populated areas. Generation of energy may be done with electromechanical generators driven by heat engines, the kinetic energy of water (hydro) and/or wind, solar photovoltaics, and geothermal power. Energy sources of the energy grid 500 may include extremely high voltage (EHV) power sources (e.g., power sources in a range of a few hundred megawatts (MW) to tens of thousands of MW or higher, in one example 300 MW-25000 MW power sources), such as large fossil fuel plants 512 (e.g., coal plants), nuclear power plants 514, and renewable energy sources such as hydroelectric plants 516 (e.g., dams). Energy sources of the energy grid 500 may include high voltage (HV) power sources (e.g., power sources in a range of a tens of MW to hundreds of MW, in one example 20 MW-299 MW power sources), such as medium-sized fossil fuel plants 522, 524. Energy sources of the energy grid may include low power sources (e.g., power sources up to tens of MW, in one example 0 MW-20 MW power sources), such small fossil fuel plants 532 (e.g., a city power plant), and renewable energy sources such as solar farms 534, wind farms 536, and geothermal energy storage 538. These power stations produce electricity, which is then transmitted to the next component of the grid. A BESS 505 may be an LV, HV, or EHV energy source. For example, a BESS may store up energy up to the megawatt hour (MWh) to gigawatt hour (GWh) range.

It should be understood that while FIG. 5 illustrates example energy sources of an energy grid 500, the energy grid 500 may include additional energy sources, different types of energy sources, or a subset of the depicted energy sources. Further, it should be understood that while certain energy sources are described as extremely high voltage, high voltage, and low voltage, that this is only one illustrated example and that any of the energy sources described herein may be low voltage, high voltage, or extremely high voltage energy sources.

Electric power transmission of electrical energy in the energy grid 500 from a generating site (e.g., a power station) may be transmitted via a web of interconnected power lines to an electrical substation from which the electric power is connected to the distribution system. Transmission networks may be complex with redundant pathways. The physical layout is often forced by what land is available and its geology. Redundancy allows line failures to occur and the power can be rerouted through a redundant pathway while repairs are done.

The transmission component of the energy grid 500 includes a network of power lines 550 and transmission towers 552, supporting overhead power lines, that transport electricity from the power sources to local substations. Because the power may be generated far from where the power is consumed, the transmission system can cover great distances. For a given amount of power, transmission efficiency is greater at higher voltages and lower currents. Therefore, voltages may be stepped up at the generating station, and stepped down at local substations (e.g., transformers) for distribution to customers. Use of high voltage power lines 550 minimizes energy loss during transmission.

Once the electricity reaches the local substations, the electricity enters the distribution component of the energy grid 500. Distribution is the final stage in the delivery of power where electricity is distributed from the transmission system to individual consumers. The distribution system includes transformers (not shown), low-voltage power lines 554, and other equipment (not shown) that bring electricity from the substations to homes 542, businesses/factories 540, farms 546, and/or other electricity consumers. Electrical substations may step voltage up or down (e.g., to customer service voltages).

Overall, the energy grid 500 is an essential part of modern society, providing a reliable and affordable source of electricity to power homes, businesses, and infrastructure around the world. The energy grid 500 is designed to be a highly interconnected system. This means that if one part of the energy grid 500 fails, the other parts can still function, allowing power to be rerouted and preventing widespread power outages. Additionally, the energy grid 500 balances the supply and demand of electricity in real-time, ensuring that enough electricity is available to meet the needs of consumers at all times.

One approach for balancing the supply and demand of electricity is the use of grid energy storage (also called large-scale energy storage). Grid energy storage refers to a collection of methods used for energy storage on a large scale within an electrical power grid. Energy is stored during times when electricity is plentiful and inexpensive (especially from intermittent power sources such as renewable electricity from wind power, tidal power, and solar power) or when demand is low, and the energy is later returned to the grid when demand is high, and electricity prices tend to be higher.

Conventionally, the largest form of grid energy storage is dammed hydroelectricity. Developments in battery storage have enabled commercially viable projects to store energy during peak production and release during peak demand, and for use when production unexpectedly falls giving time for slower responding resources to be brought online. Another form of energy storage is geothermal energy storage. As shown in FIG. 5, energy grid 500 may include a geothermal energy storage 538. Geothermal energy storage is a method of storing thermal energy produced by geothermal power plants for later use. The process involves the use of underground reservoirs or aquifers to store the excess heat produced during the operation of a power plant. The stored heat can then be retrieved and used to generate electricity during periods of high energy demand, such as peak hours, or during periods of low energy production, such as when the geothermal source is not producing enough heat. One advantage of geothermal energy storage is its high efficiency. Another form of grid energy storage is battery energy storage. As shown in FIG. 5, energy grid 500 may include a BESS 505.

As discussed herein, the COP, and thereby the RTE and operating cost, of an active-cooled BESS may vary with the ambient temperature. In addition, the cost of energy (e.g., the energy used for the active-cooling components), which may be supplied by the energy grid 500, varies over time, based on multiple factors including supply, demand, and many other factors that affect energy pricing. Accordingly, it is desirable to smartly operate the active-cooling of a BESS to minimize costs and/or to maximize the RTE of the active-cooling.

Figure 6:
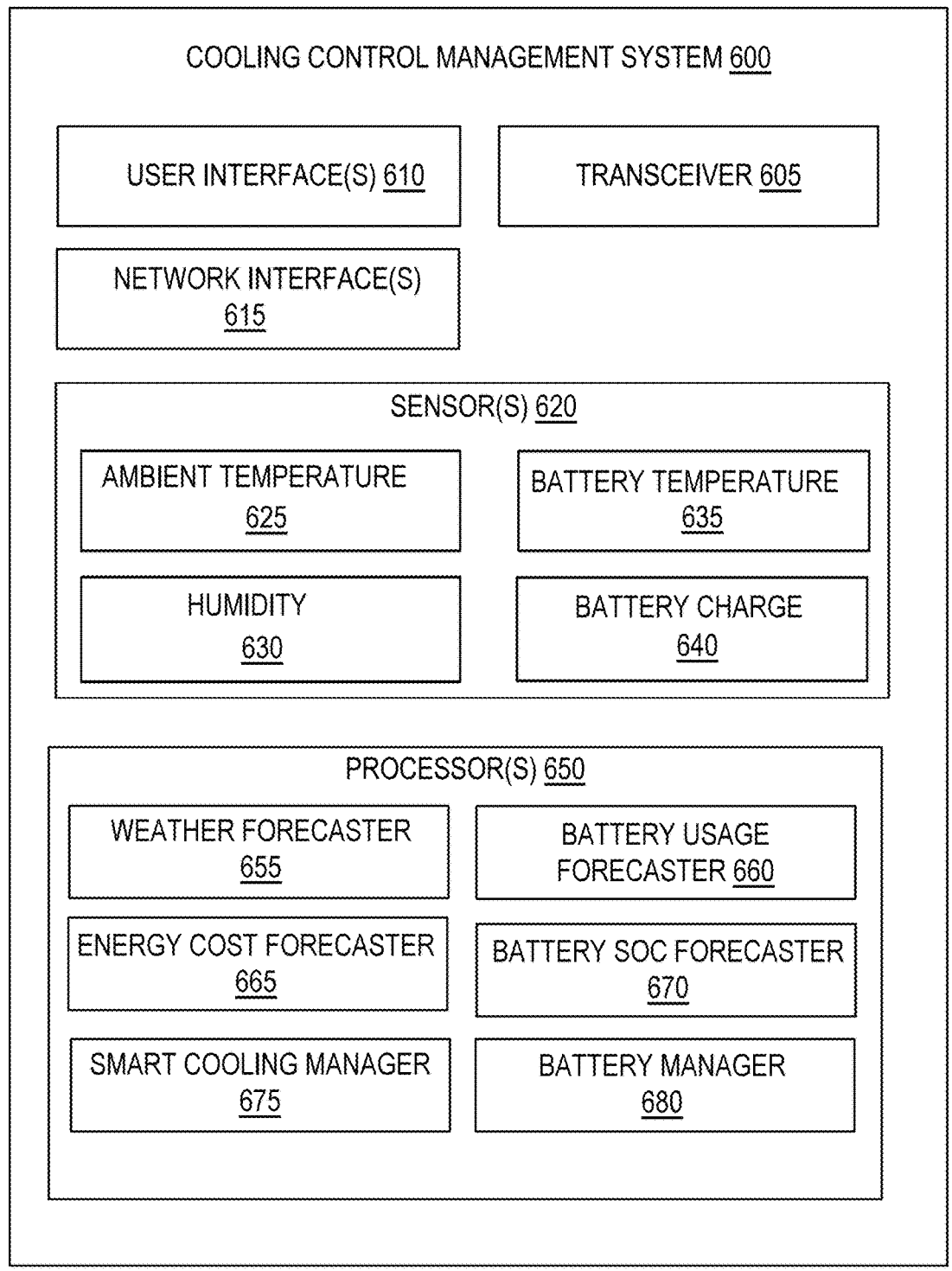
FIG. 6 is an example cooling control management system for smart cooling of an active-cooled BESS.

Example Smart Temperature Control for Active-Cooled Battery Energy Storage System According to certain aspects, a cooling control management system is provided for smartly controlling an active-cooled BESS (e.g., such as the active-cooled BESS 200 described with respect to FIGS. 2-4). In some aspects, the cooling control management system may be part of an energy management system (e.g., such as the control system 120 described with respect to the example BESS 100 of FIG. 1), where the BESS may be part of an energy grid (e.g., such as the BESS 505 in the energy grid 500 described with respect to FIG. 5). The cooling control management system may be local to the site of the BESS, may be remote, may include both local and remote components, and/or may be distributed. Accordingly, the cooling control management system may run on a single computing device or across multiple devices. An example cooling control management system 600 for smart control of an active-cooled BESS is depicted in FIG. 6.

As shown, the cooling control management system 600 may include one or more user interfaces 610 on the one or more devices comprising the cooling control management system 600 that allow a user to interact with the cooling control management system 600. For example, the user interface(s) 610 may include a graphical user interface (GUI) that display to a user and/or accepts touch screen inputs from the user. The user interface(s) 610 may includes one or more input/output (IOs) interfaces that allows one or more I/O devices (e.g., keyboards, displays, mouse devices, pen inputs, microphones, etc.) to connect to the cooling control management system 600.

As shown, the cooling control management system 600 may include a transceiver 605 and one or more network interface(s) 615. The transceiver 605 and network interface(s) 615 may allow the product scanning device to connect to a network (e.g., such as the Internet, a local area network (LAN), a wireless LAN (WLAN), a wireless wide area network (WWAN), Wi-Fi, etc.) and/or to communicate with other devices, such as other parts of the cooling control management system 600 and/or other parts of the BESS for management of the BESS. As described in more detail herein, the cooling control management system 600 may use the transceiver 605 and network interface(s) 615 to gather sensor data about the BESS, to access the Internet to obtain current and/or forecast weather forecast data, current and/or forecast energy pricing data used for the cooling control management, to control the active cooling system of the BESS, and to control the charging and discharging operations of the BESS.

As shown, the cooling control management system 600 may include one or more sensor(s) 620. The sensor(s) 620 may include sensors configured to collect data and/or measurements used for the cooling control management. For example, as shown, the sensor(s) 620 may include an ambient temperature sensor(s) 625 configured to collect ambient temperature data. The ambient temperature data may include the temperature of the air inside the housing (e.g., housing 205) of the BESS and/or the ambient temperature of the air outside of the housing. The sensor(s) 620 may include humidity sensor(s) 630 configured to collect humidity data. The humidity data may include the humidity of the air inside the housing of the BESS and/or the humidity of the air outside of the housing. The sensor(s) 620 may include battery temperature sensor(s) 635 configured to collected data about the temperature of individual battery cells of the BESS, of battery banks of the BESS, and/or of other groupings of batteries in the BESS. The sensor(s) 620 may include battery charge sensor(s) 640 configured to collect data about the state of charge of the batteries of the BESS. The sensor(s) 620 may include current sensor(s) (now shown) configured to collect data regarding the electrical current of the batteries of the BESS during charging and/or during discharging of the batteries. The sensor(s) 620 may include additional sensors not shown configured to collect data and/or measurements used for the cooling control management.

As shown, the cooling control management system 600 may include a processing system including one or more processor(s) 650. The one or more processor(s) 650 may comprise one or more central processing units (CPUs). The system may further include memory and/or storage, which may be local to the cooling control management system 600 or remote (e.g., cloud storage). The CPU may retrieve and execute programming instructions stored in the memory. Similarly, the CPU may retrieve and store application data residing in the memory. The CPU may have multiple processing cores. The memory may represent a random access memory (RAM). The storage may be a disk drive, a combination of fixed or removable storage devices, such as fixed disc drives, removable memory cards or optical storage, network attached storage (NAS), or a storage area-network (SAN).

As shown, the one or more processor(s) 650 may include a weather forecaster 655. The weather forecaster 655 may be configured to determine the current weather conditions and/or to forecast future weather conditions. In some aspects, the weather forecaster 655 determines the weather conditions based on the sensor data, for example from ambient temperature sensor 625 and/or humidity sensor 630. In some aspects, the weather forecaster 655 determines the weather conditions by accessing a weather source (e.g., a weather forecasting service) over a network, for example using transceiver 605 and network interface(s) 615. In some aspects, the weather data used and/or the weather conditions predicted, by the weather forecaster 6WEA55, includes cloud conditions and/or other weather conditions.

As shown, the one or more processor(s) 650 may include a battery usage forecaster 660. The battery usage forecaster 660 may be configured to determine the current battery usage of the batteries of the BESS and/or to forecast future battery usage of the batteries of the BESS. The battery usage may include determining charging and/or discharging times, duration, and/or amounts. In some aspects, the battery usage forecaster 660 determines the battery usage based on the sensor data, for example from battery charge sensor 640 and/or algorithms such as statistical modelling (ie machine learning and/or neural networks) based on patterns found based on historical data. For instance, it can be determined that the load/grid requires battery discharging generally during a certain period of the day when the temperature is in a certain range in a certain period of the year. In some aspects, the battery usage forecaster 660 determines the battery usage by accessing the network, for example using transceiver 605 and network interface(s) 615, and/or based on input from a user.

As shown, the one or more processor(s) 650 may include an energy cost forecaster 665. The energy cost forecaster 665 may be configured to determine the current cost of energy (e.g., the price per kilowatt hour of energy consumption from the energy grid) and/or to forecast future energy cost. In some aspects, the energy cost forecaster 665 estimates the cost of energy based on available data. In some aspects, the energy cost forecaster 665 determines the energy cost by accessing the network, for example using transceiver 605 and network interface(s) 615, and/or based on input from a user. For example, the Electric Reliability Council of Texas provides current and forecasted energy prices on their website.

As shown, the one or more processor(s) 650 may include a battery state-of-charge (SOC) forecaster 670. The battery SOC forecaster 670 may be configured to determine the current battery state of charge of the batteries of the BESS and/or to forecast future battery state of charge of the batteries of the BESS. The battery state of charge may include the amount of stored energy in the batteries. In some aspects, the battery SOC forecaster 670 determines the battery usage based on the sensor data, for example from battery charge sensor 640. In some aspects, the battery SOC forecaster 670 determines the state of charge of the batteries by accessing the network, for example using transceiver 605 and network interface(s) 615, and/or based on input from a user.

As shown, the one or more processor(s) 650 may include a battery manager 680. The battery manager 680 may be configured to instruct the batteries of the BESS to control charging and discharging operations of the batteries.

Figure 7:
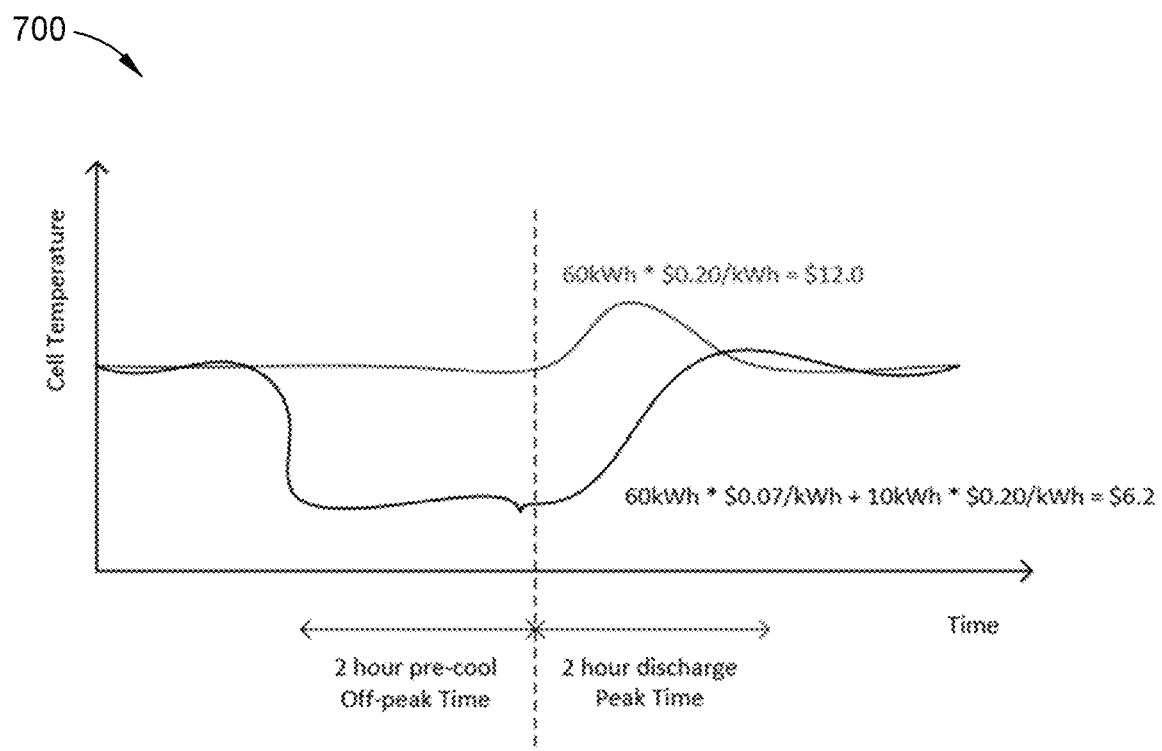
FIG. 7 is a table depicting example battery cell temperatures over time in the case of a pre-cooling period before a discharge period and the cost of no pre-cooling before the discharge period.

As shown, the one or more processor(s) 650 may include a smart cooling controller 675. The smart cooling controller 675 may be configured to instruct the active-cooling system of the BESS to control when and for how long cooling is performed. In some aspects, the smart cooling controller 675 controls the active-cooling of the BESS to maintain the temperature of the battery cells of the BESS within the specified optimal temperature ranges for the batteries. In some aspects, the smart cooling controller 675 controls the active-cooling of the BESS to minimize the energy costs of the cooling. In some aspects, the smart cooling controller 675 controls the active-cooling of the BESS to maximize revenue of the BESS. In some aspects, the smart cooling controller 675 controls the active-cooling of the BESS to maximize the RTE of the BESS. In some aspects, the smart cooling controller 675 controls the active-cooling of the BESS based on a balance of maximizing RTE, minimizing energy costs, and maintaining the battery cells of the BESS with the optimal temperature ranges. Techniques for the smart cooling controller 675 are described in more detail below and with respect to FIG. 7.

According to certain aspects, the smart cooling controller 675 uses the information from the weather forecaster 655, the battery usage forecaster, the energy cost forecaster 665, and the battery SOC forecaster 670 to perform the smart cooling of the BESS. In an embodiment, the smart cooling controller uses at least the information of the energy cost forecaster 665 and/or battery usage forecaster to perform the smart cooling of the BESS. In some aspects, the smart cooling controller 675 also has information about the characteristics of the cooling system (e.g., COP information used to determine the COP of the cooling system based on the ambient temperature). The characteristics of the cooling system may be pre-programmed, input by a user, and/or learned over time (for instance, using statistic modelling and historical data, with techniques such as machine learning, or neural networks) by the smart cooling controller 675.

According to certain aspects, the smart cooling controller 675 can determine whether to perform pre-cooling of the BESS, based on different target parameters such as the target cell temperature range, a scheduled charge or discharge, a COP of the cooling system based on the forecast ambient temperatures at the pre-cooling time and at the scheduled charge or discharge time, based on the forecast cost of energy at the pre-cooling time and at the scheduled charge or discharge time, and based on a comparison of total cost of cooling during the scheduled charge or discharge without pre-cooling (to maintain the target cell temperature range) with the total cost of the pre-cooling and cooling during the scheduled charge or discharge with pre-cooling (to maintain the target cell temperature range).

In an illustrative example, the smart cooling controller 675 may control the active-cooling of the BESS to maximize revenue of the system. Battery cells dissipate heat when during discharges and charging. The amount of heat dissipation depends on the discharged or charged rate. For example, a single battery cell may dissipate heat up to ~45 W over a two hour discharge period. If there is no external cooling of the cell temperature, the cell can quickly reach the operating temperature limit (e.g., 45 degrees C. to 50 degrees C.), leading to shut down of system. To reduce the cell temperature rise, the battery system may use auxiliary power to run the cooling system. The BESS may have a large number of battery cells (e.g., around 1800 cells). In some cases, the discharge cycle happens during peak hour, for example where demand is high but where the energy cost is also high.

In this illustrative example, the peak hour energy cost is $0.20 per kilowatt hour (kWh), while the off-peak hour energy cost is $0.07 per kWh. In this illustrative example, the cooling system requires 81 KW per hour of thermal cooling power to cool the system during two hours of discharge, to maintain the batteries within the operating temperature limits, in this case 162 kWh is needed to cool the system for two hours during two hour discharge during the peak hours. In this illustrative example, the cooling system has a COP of 4 at the ambient temperature during the discharge. Thus, with the COP of 4, about 40 kWh of energy is needed for the cooling system. In this illustrative example, the contain cooling fans, for air circulation in the cooling system, consume an additional 20 kWh during the two hour discharge and cooling period, leading two a total of 60 kWh energy needed for the two hours. At the peak hour energy cost of $0.20 per kWh, the total cost for the auxiliary energy to run the cooling system during the two hour discharge cycle is $12.00.

In this illustrative example, the smart cooling controller 675 may determine to pre-cool the system based on the forecasting data. For example, the smart cooling controller 675 may compare the costs associated with the pre-cooling to the costs associated with performing the cooling at the discharge time. In this illustrative example, the smart cooling controller 675 may compare with the $12.00 cost of the cooling during the peak hours with the cost of performing pre-cooling of the BESS during non-peak hours. For example, for the 60 kWh of energy for the cooling at the non-peak rate of $0.07 per kWh, the cost of pre-cooling would be $4.20. With the pre-cooling, the BESS may only need to use the circulation fans during the cooling during 2-hour discharge during the peak hours using 10 kWh of energy at the $0.20 per kWh rate for a $2.00 cost. Thus, the total cost of the 2-hour discharge during the peak hour with the smart pre-cooling of the BESS during the non-peak hours would be only $6.20 as compared to $12.00 cost without pre-cooling, saving $5.80 per discharge cycle. For a large site, with around 100 containers, the saving per discharge cycle would $580.00. As shown in Table 700 in FIG. 7, the temperature of the batteries can be maintained throughout the discharge cycle while achieving the cost savings.

According to certain aspects, the smart cooling controller 675 can determine to maximize RTE of the cooling system. For example, the smart cooling controller 675 may determine to perform pre-cooling of the BESS when ambient temperature is lowest, and the COP of the cooling system is the highest. Maximizing the RTE of the cooling system may increase the lifetime of the cooling system and/or the BESS, improve efficiency, and/or reduce costs of cooling. For example, referring to the system of the previous illustrative example, if ambient temperature drop during the night to 25 degrees C. and is higher during day at 40 degrees C., the COP is 2.5 during the day and increases to 4.5 at night. Thus, the energy needed to run to the cooling system decreases from 64.8 kWh needed during the day to only 36 kWh during the night, due to the change in COP. The difference of 28.8 kWh from running the cooling system during the night would increase RTE of a 1 MWh BESS by 3 percent.

According to certain aspects, the smart cooling controller 675 can determine to pre-cool the BESS based on state-of-charge of the battery cells. For example, if the state-of-charge of the battery cells is low, then there is low risk or low levels of self-discharge, and pre-cooling may therefore not be desirable. On the other hand, if the state-of-charge of the battery cells is high, then there is high risk or high levels of self-discharge, and the smart cooling controller 675 may determine to perform pre-cooling to limit the self-discharge.

In some aspects, the smart cooling controller 675 may balance the cost comparison of pre-cooling, the RTE comparison, and/or the state-of-charge of the battery cells in determining whether to pre-cool the BESS.

Figure 8:
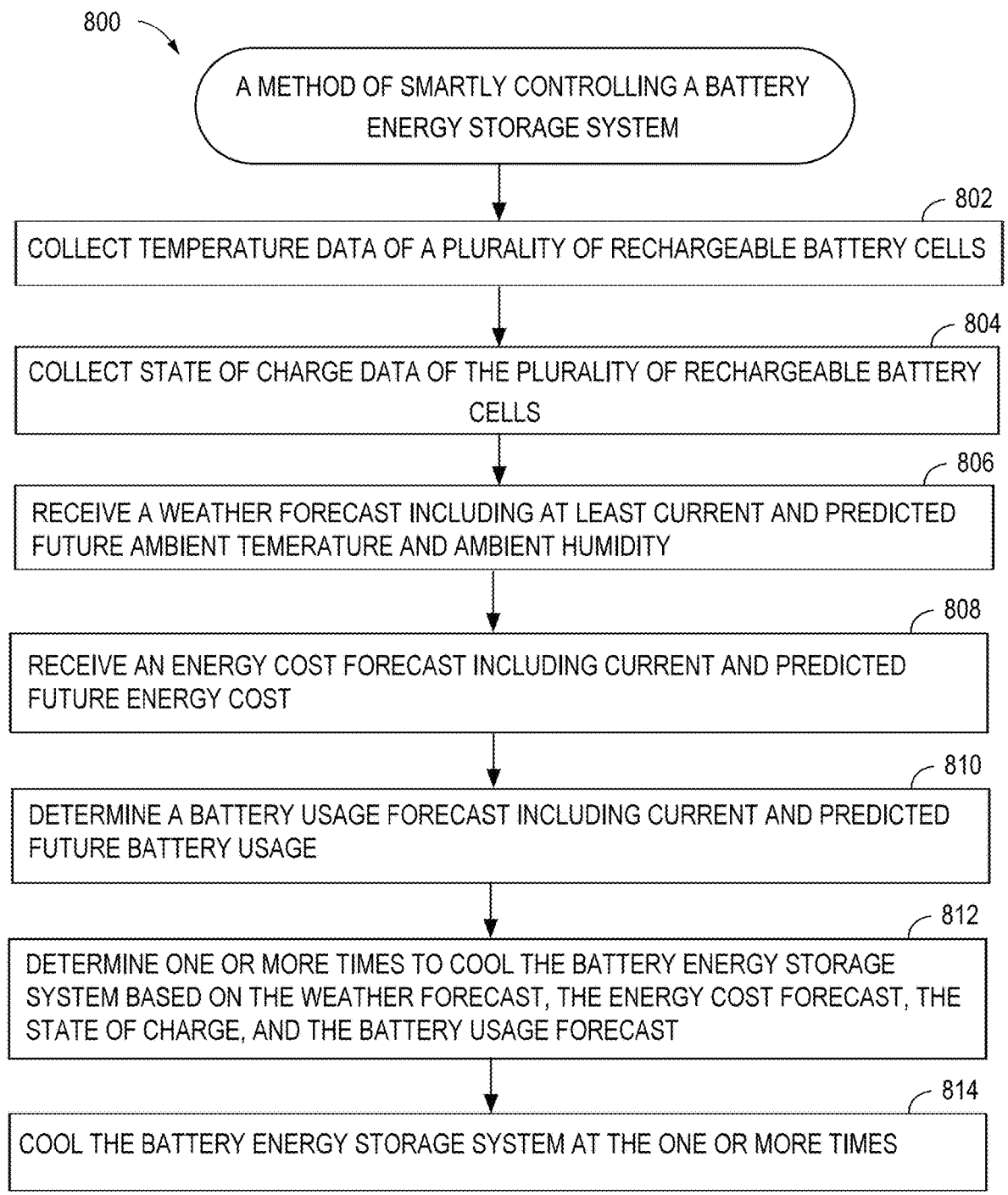
FIG. 8 is a flow diagram depicting an example method for smart cooling of an active-cooled BESS.

FIG. 8 is a flow diagram depicting an example operations 800 for smart control of a BESS (e.g., such as the BESS 100 or the BESS 200).

As shown, the operations 800 may include, at operation 802, collecting temperature data of a plurality of rechargeable battery cells.

The operations 800 may include, at operation 804, collecting state of charge data of the plurality of rechargeable battery cells.

The operations 800 may include, optionally, at operation 806, receiving a weather forecast including least current and predicted future ambient temperature and humidity conditions.

The operations 800 may include, at operation 808, receiving an energy cost forecast of a current energy cost and a predicted future energy cost.

The operations 800 may include, at operation 810, determining a battery usage forecast including a current usage of the plurality of rechargeable battery cells and predicted future usage of the plurality of rechargeable battery cells.

The operations 800 may further include, optionally, determining, based on the state of charge data, a state of charge forecast of at least current state of charge of the plurality of rechargeable battery cells and predicted state of charge of the plurality of rechargeable battery cells. In some aspects, the state of charge forecast may be determine a predicted future state of charge based on the current state of charge, predicted self-discharge, efficiencies of the battery energy storage system, and/or future discharge and/or charge cycles.

The operations 800 may include, at operation 812, determining one or more times to cool the battery energy storage system based on one or more of: the weather forecast, the energy cost forecast, the state of charge, and the battery usage forecast. In an embodiment, the one or more times to cool the battery energy storage system are determined to optimize one or more parameters such as revenue of the BESS, RTE of the BESS.

The operations 800 may include, at operation 814, cooling the battery energy storage system at the one or more times.

Figure 9:
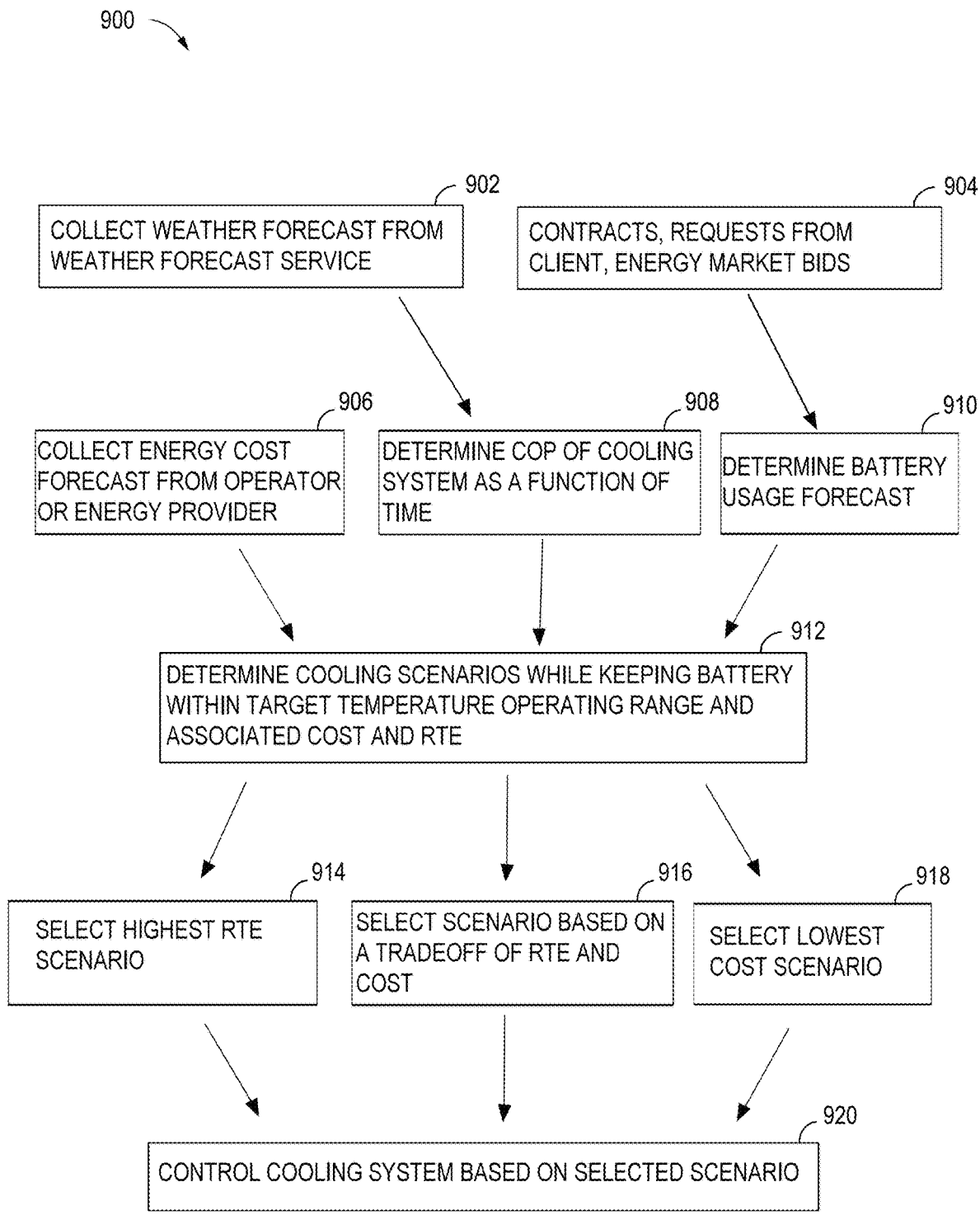
FIG. 9 is a work flow diagram depicting example operations for smart control of a BESS.

FIG. 9 is a work flow diagram depicting an example operations 900 for smart control of a BESS (e.g., such as the BESS 100 or the BESS 200).

As shown in FIG. 9, the work flow includes collecting a weather forecast from a weather forecast service at operation 902 used to determine a CoP of the cooling system as a function of time at operation 908.

At operation 904, the work flow includes identifying energy contracts, energy requests from a client, and/or energy bids used to determine a battery usage forecast at operation 910.

At operation 906, the work flow includes collecting an energy cost forecast from an operator or energy provider.

The COP determined at operation 908, the battery usage forecast determined at operation 910, and the energy cost forecast collected at operation 906 may be provided to a smart cooling controller to determine, at operation 912, possible cooling scenarios including cooling times, cooling durations, pre-cooling times and durations, and the cost and RTE associated with each of the scenarios.

At operation 914, the work flow may include selecting the scenario with the highest RTE.

At operation 916, the work flow may include selecting a scenario based on a tradeoff of the associated RTE and cost.

At operation 918, the work flow may include selecting the scenario with the lowest cost.

At operation 920, the work flow includes controlling the cooling system based on the selected scenario.

Example Clauses

Implementation examples are described in the following numbered aspects:

Aspect 1: A battery energy storage system comprising: a plurality of rechargeable battery cells; a cooling system configured to cool the plurality of rechargeable battery cells; and a cooling management system configured to control the cooling system, the cooling management system comprising: one or more battery temperature sensors configured to collect temperature data of the plurality of rechargeable battery cells; one or more battery charge sensors configured to collect data of a state of charge of the plurality of rechargeable battery cells; and a smart cooling controller, the smart cooling controller including at least: an energy cost forecast processor configured to obtain an energy cost forecast of a current energy cost and a predicted future energy cost; and a battery usage forecast processor configured to determine a battery usage forecast of a current usage of the plurality of rechargeable battery cells and a predicted future usage of the plurality of rechargeable battery cells, wherein the smart cooling controller is configured to determine one or more times to cool the battery energy storage system based on the weather forecast, the energy cost forecast, the state of charge, and the battery usage forecast, and wherein the cooling management system is configured to control the cooling system to cool the battery energy storage system at the one or more times.

Aspect 2: The battery energy storage system of Aspect 1, further comprising one or more sensors configured to measure ambient weather data.

Aspect 3: The battery energy storage system of any combination of Aspects 1-2, further comprising a weather forecast processor configured to obtain a weather forecast of current weather conditions and predicted future weather conditions, wherein the weather conditions include at least ambient temperature and ambient humidity.

Aspect 4: The battery energy storage system of Aspect 3, wherein the weather forecast processor is configured to receive the weather forecast via a network interface of the cooling management system.

Aspect 5: The battery energy storage system of any combination of Aspects 1-4, wherein the energy cost forecast processor is configured to receive the energy cost forecast via a network interface of the cooling management system.

Aspect 6: The battery energy storage system of any combination of Aspects 1-5, wherein the battery usage forecast processor is configured to identify one or more scheduled periods of charging of the plurality of rechargeable battery cells, one or more periods of discharging of the plurality of rechargeable batteries, or a combination thereof.

Aspect 7: The battery energy storage system of any combination of Aspects 1-6, further comprising a state of charge forecast processor configured to determine, based on the state of charge data, a state of charge forecast of at least current state of charge of the plurality of rechargeable battery cells and predicted state of charge of the plurality of rechargeable battery cells, wherein the smart cooling controller is configured to determine one or more times to cool the battery energy storage system further based on the state of charge forecast.

Aspect 8: The battery energy storage system of any combination of Aspects 1-7, wherein the smart cooling controller is configured to determine to cool the battery energy storage system to maintain a temperature of the plurality of rechargeable batteries with a specified temperature range, in response to the energy cost forecast, the battery usage forecast, the state of charge, and optionally the weather forecast and/or the state of charge forecast, or a combination thereof.

Aspect9: The battery energy storage system of Aspect 8, wherein the smart cooling controller is configured to determine to pre-cool the battery energy storage system prior to a time of a scheduled charging or discharging of the plurality of rechargeable battery cells in response to the energy cost forecast, the battery usage forecast, the state of charge, and optionally the weather forecast and/or the state of charge forecast, or a combination thereof.

Aspect 10: The battery energy storage system of Aspect 9, wherein the smart cooling controller is configured to determine to pre-cool the battery energy storage system based on a comparison of a first total cost of cooling, including a cost of the pre-cooling, the battery energy system to maintain the temperature of the plurality of rechargeable batteries with the specified temperature range in response to the energy cost forecast, the battery usage forecast, the state of charge, and optionally the weather forecast and/or the state of charge forecast, or the combination thereof, to a second total cost of the cooling without the pre-cooling.

Aspect 11: The battery energy storage system of any combination of Aspect 10, wherein the smart cooling controller is configured to: estimate the first total cost of cooling, including the cost of the pre-cooling, based on a predicted energy usage for the pre-cooling and a cost of energy at the time of the pre-cooling and a first predicted energy usage for the cooling and the predicted cost of energy at the time of the cooling; and estimate the second total cost of the cooling without the pre-cooling based on a second predicted energy usage for the cooling and the predicted of cost of energy at the time of the cooling, wherein the second predicted energy usage for the cooling is smaller than the first predicted energy usage for the cooling.

Aspect 12: The battery energy storage system of any combination of Aspect 11, wherein the smart cooling controller is configured to: estimate the predicted energy usage for the pre-cooling based on a first coefficient-of-performance (COP) of the cooling system, wherein the first COP is based on a first predicted ambient temperature at the time of the pre-cooling; and estimate the first and second predicted energy usages for the cooling based on a second COP of the cooling system, wherein the second COP is based on a second predicted ambient temperature at the time of the cooling.

Aspect 13: The battery energy storage system of any combination of Aspects 9-12, wherein the smart cooling controller is configured to determine to pre-cool the battery energy storage system based on a comparison of a first round-trip-efficiency (RTE) of the battery energy storage system associated with the pre-cooling to a second RTE of the battery energy storage system associated with the cooling.

Aspect 14: The battery energy storage system of Aspect 13, wherein the smart cooling controller is configured to: estimate the first RTE based on a first coefficient-of-performance (COP) of the cooling system, wherein the first COP is based on a first predicted ambient temperature at the time of the pre-cooling; and estimate the second RTE based on a second COP of the cooling system, wherein the second COP is based on a second predicted ambient temperature at the time of the cooling.

Aspect 15: The battery energy storage system of any combination of Aspects 9-14, wherein the smart cooling controller is configured to determine to pre-cool the battery energy storage system in response to determining the state of charge or a predicted state of charge of the plurality of rechargeable batteries is at or above a threshold charge.

Aspect 16: The battery energy storage system of any combination of Aspects 9-15, wherein the smart cooing controller is configured to determine not to pre-cool the battery energy storage system in response to determining the state of charge or predicted state of charge of the plurality of rechargeable batteries is below a threshold charge.

Aspect 17: The battery energy storage system of any combination of Aspects 1-16, wherein the smart cooing controller is configured to the one or more times to cool the battery energy storage system to minimize a cost of the cooling at the one or more times or to maximize a round trip efficient (RTE) of the battery energy storage system.

Aspect 18: The battery energy storage system of any combination of Aspects 1-17, wherein the energy cost forecast processor configured to estimate the energy cost forecast of the at least current energy cost and the predicted future energy cost.

Aspect 19: A method for performing operations of the battery energy storage system of any of Aspects 1-18.

Aspect 20: A smart cooling controller of any of Aspects of 1-18.

Aspect 21: An apparatus comprising means for performing operations of the battery energy storage system of any of Aspects 1-18.

Aspect 22: A non-transitory computer readable medium comprising instructions for performing operations of the battery energy storage system of any of Aspects 1-18.

Additional Considerations

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the general principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various actions may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The various illustrative logical blocks, modules and circuits described in connection with the present disclosure may be implemented or performed with a general purpose processor, a digital signal processor (DSP), an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more actions for achieving the methods. The method actions may be interchanged with one another without departing from the scope of the claims. In other words, unless a specific order of actions is specified, the order and/or use of specific actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for". All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

The invention claimed is:

1. A battery energy storage system comprising:
   a plurality of rechargeable battery cells;
   a cooling system configured to cool the plurality of rechargeable battery cells; and
   a cooling management system configured to control the cooling system, the cooling management system comprising:
      one or more battery temperature sensors configured to collect temperature data of the plurality of rechargeable battery cells;
      one or more battery charge sensors configured to collect data of a state of charge of the plurality of rechargeable battery cells; and
      a smart cooling controller, the smart cooling controller including at least:
         an energy cost forecast processor configured to obtain an energy cost forecast of a current energy cost and a predicted future energy cost; and
         a battery usage forecast processor configured to determine a battery usage forecast of a current usage of the plurality of rechargeable battery cells and a predicted future usage of the plurality of rechargeable battery cells,
      wherein the smart cooling controller is configured to determine one or more times to cool the battery energy storage system based on the energy cost forecast, the state of charge, and the battery usage forecast, and
      wherein the cooling management system is configured to control the cooling system to cool the battery energy storage system at the one or more times.

2. The battery energy storage system of claim 1, further comprising one or more sensors configured to measure ambient weather data.

3. The battery energy storage system of claim 1, further comprising a weather forecast processor configured to obtain a weather forecast of current weather conditions and predicted future weather conditions, wherein the weather conditions include at least ambient temperature and ambient humidity.

4. The battery energy storage system of claim 3, wherein the weather forecast processor is configured to receive the weather forecast via a network interface of the cooling management system.

5. The battery energy storage system of claim 1, wherein the energy cost forecast processor is configured to receive the energy cost forecast via a network interface of the cooling management system.

6. The battery energy storage system of claim 1, wherein the battery usage forecast processor is configured to identify one or more scheduled periods of charging of the plurality of rechargeable battery cells, one or more periods of discharging of the plurality of rechargeable battery cells, or a combination thereof.

7. The battery energy storage system of claim 1, wherein the smart cooling controller is configured to determine to cool the battery energy storage system to maintain a temperature of the plurality of rechargeable battery cells with a specified temperature range, in response to the energy cost forecast, the battery usage forecast, the state of charge, or a combination thereof.

8. The battery energy storage system of claim 7, wherein the smart cooling controller is configured to determine to pre-cool the battery energy storage system prior to a time of a scheduled charging or discharging of the plurality of rechargeable battery cells in response to the energy cost forecast, the battery usage forecast, the state of charge, or a combination thereof.

9. The battery energy storage system of claim 8, wherein the smart cooling controller is configured to determine to pre-cool the battery energy storage system based on a comparison of a first total cost of cooling, including a cost of the pre-cooling, for the battery energy storage system to maintain the temperature of the plurality of rechargeable battery cells with the specified temperature range in response to the energy cost forecast, the battery usage forecast, the state of charge, or the combination thereof, to a second total cost of the cooling without the pre-cooling.

10. The battery energy storage system of claim 9, wherein the smart cooling controller is configured to:
    estimate the first total cost of cooling, including the cost of the pre-cooling, based on a predicted energy usage for the pre-cooling, a cost of energy at the time of the pre-cooling, a first predicted energy usage for the cooling, and the predicted cost of energy at the time of the cooling; and
    estimate the second total cost of the cooling without the pre-cooling based on a second predicted energy usage for the cooling and the predicted of cost of energy at the time of the cooling, wherein the second predicted energy usage for the cooling is smaller than the first predicted energy usage for the cooling.

11. The battery energy storage system of claim 10, wherein the smart cooling controller is configured to:
    estimate the predicted energy usage for the pre-cooling based on a first coefficient-of-performance (COP) of the cooling system, wherein the first COP is based on a first predicted ambient temperature at the time of the pre-cooling; and
    estimate the first and second predicted energy usages for the cooling based on a second COP of the cooling system, wherein the second COP is based on a second predicted ambient temperature at the time of the cooling.

12. The battery energy storage system of claim 8, wherein the smart cooling controller is configured to determine to pre-cool the battery energy storage system based on a comparison of a first round-trip-efficiency (RTE) of the battery energy storage system associated with the pre-cooling to a second RTE of the battery energy storage system associated with the cooling.

13. The battery energy storage system of claim 12, wherein the smart cooling controller is configured to:
    estimate the first RTE based on a first coefficient-of-performance (COP) of the cooling system, wherein the first COP is based on a first predicted ambient temperature at the time of the pre-cooling; and
    estimate the second RTE based on a second COP of the cooling system, wherein the second COP is based on a second predicted ambient temperature at the time of the cooling.

14. The battery energy storage system of claim 8, wherein the smart cooling controller is configured to determine to pre-cool the battery energy storage system in response to determining the state of charge or a predicted state of charge of the plurality of rechargeable battery cells is at or above a threshold charge.

15. The battery energy storage system of claim 8, wherein the smart cooing controller is configured to determine not to pre-cool the battery energy storage system in response to determining the state of charge or a predicted state of charge of the plurality of rechargeable battery cells is below a threshold charge.

16. The battery energy storage system of claim 1, wherein the smart cooing controller is configured to determine the one or more times to cool the battery energy storage system to minimize a cost of the cooling at the one or more times or to maximize a round trip efficient (RTE) of the battery energy storage system.

17. The battery energy storage system of claim 1, further comprising a state of charge forecast processor configured to determine, based on the state of charge data, a state of charge forecast of at least current state of charge of the plurality of rechargeable battery cells and predicted state of charge of the plurality of rechargeable battery cells, wherein the smart cooling controller is configured to determine one or more times to cool the battery energy storage system further based on the state of charge forecast.

18. A method for cooling a battery energy storage system, the method comprising:
   collecting temperature data of a plurality of rechargeable battery cells;
   collecting state of charge data of the plurality of rechargeable battery cells;
   obtaining an energy cost forecast of a current energy cost and a predicted future energy cost;
   obtaining a battery usage forecast of at least a current usage of the plurality of rechargeable battery cells and predicted future usage of the plurality of rechargeable battery cells;
   determining one or more times to cool the battery energy storage system based on the energy cost forecast, the state of charge, and the battery usage forecast; and
   cooling the battery energy storage system at the one or more times.

19. The method of claim 18, wherein determining the one or more times to cool the battery energy storage system comprises determining the one or more times to minimize a cost of the cooling at the one or more times or to maximize a round trip efficient (RTE) of the battery energy storage system.

20. A smart cooling controller for cooling a battery energy storage system, the smart cooling controller comprising:
   an energy cost forecast processor configured to obtain an energy cost forecast of a current energy cost and a predicted future energy cost;
   a state of charge forecast processor configured to determine at least a current state of charge of a plurality of rechargeable battery cells; and
   a battery usage forecast processor configured to determine a battery usage forecast of a current usage of the plurality of rechargeable battery cells and a predicted future usage of the plurality of rechargeable battery cells,
   wherein the smart cooling controller is configured to determine one or more times to cool the battery energy storage system based on the energy cost forecast, the current state of charge, and the battery usage forecast, and
   wherein the smart cooling controller is configured to control a cooling system to cool the battery energy storage system at the one or more times.

* * * * *